(12) United States Patent
Su et al.

(10) Patent No.: US 12,259,577 B2
(45) Date of Patent: Mar. 25, 2025

(54) DISPLAY MODULE, CONTROL METHOD THEREOF AND APPARATUS THEREOF, AND ELECTRONIC DEVICE CROSS-REFERENCE TO RELATED APPLICATIONS

(71) Applicant: VIVO MOBILE COMMUNICATION CO., LTD., Guangdong (CN)

(72) Inventors: Zipeng Su, Guangdong (CN); Yaoguang You, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 153 days.

(21) Appl. No.: 17/725,252

(22) Filed: Apr. 20, 2022

(65) Prior Publication Data

US 2022/0244456 A1    Aug. 4, 2022

Related U.S. Application Data

(63) Continuation of application No. PCT/CN2020/121148, filed on Oct. 15, 2020.

(30) Foreign Application Priority Data

Oct. 21, 2019 (CN) .......................... 201911000923.6

(51) Int. Cl.
*G06F 1/16* (2006.01)
*G02B 6/122* (2006.01)

(52) U.S. Cl.
CPC ........... *G02B 6/122* (2013.01); *G06F 1/1652* (2013.01)

(58) Field of Classification Search
CPC .................................................... G02B 6/0095
See application file for complete search history.

(56) References Cited

U.S. PATENT DOCUMENTS 9,759,406 B2 * 9/2017 Sun ........................... G02B 3/08
10,416,950 B2 * 9/2019 Kim ..................... G02B 6/0078
(Continued)

FOREIGN PATENT DOCUMENTS

CN          104299519 A       1/2015
CN          104347002 A       2/2015
(Continued)

OTHER PUBLICATIONS

Extended European Search Report for Application No. 20879512.0-1224, Nov. 17, 2022, 8 Pages.
(Continued)

*Primary Examiner* — Rhonda S Peace
(74) *Attorney, Agent, or Firm* — BROOKS KUSHMAN P.C.

(57) ABSTRACT

A display module is provided, where a display screen includes a first abutting edge, a second abutting edge, and a display body located between the first abutting edge and the second abutting edge, where the first abutting edge and the second abutting edge are located in space enclosed by the display body, the display body includes a first curved display area and a second curved display area, where the first curved display area is connected to the first abutting edge, the second curved display area is connected to the second abutting edge, the first curved display area and the second curved display area form a groove, a refracted light guide member is fixed in the groove, and the refracted light guide member refracts light, emitted from the first curved display area and the second curved display area, onto a plane in which an opening of the groove is located.

17 Claims, 3 Drawing Sheets

(56) References Cited

U.S. PATENT DOCUMENTS

| | | |
|---|---|---|
| 2013/0328792 A1 | 12/2013 | Myers et al. |
| 2015/0077990 A1 | 3/2015 | Park |
| 2015/0286457 A1 | 10/2015 | Kim et al. |
| 2016/0044751 A1 | 2/2016 | Ikeda et al. |
| 2016/0242702 A1 | 8/2016 | Wang et al. |
| 2016/0329003 A1 | 11/2016 | Wang et al. |
| 2016/0363291 A1 | 12/2016 | Sun |
| 2017/0153669 A1 | 6/2017 | Wang et al. |
| 2020/0251671 A1 | 8/2020 | Chu |
| 2021/0049940 A1 | 2/2021 | Azuma et al. |
| 2022/0244456 A1* | 8/2022 | Su .................. G06F 1/1637 |

FOREIGN PATENT DOCUMENTS

| | | |
|---|---|---|
| CN | 104392668 A | 3/2015 |
| CN | 104407465 A | 3/2015 |
| CN | 104460087 A | 3/2015 |
| CN | 104460088 A | 3/2015 |
| CN | 104571328 A | 4/2015 |
| CN | 104614855 A | 5/2015 |
| CN | 204314780 U | 5/2015 |
| CN | 106158903 A | 11/2016 |
| CN | 106663396 A | 5/2017 |
| CN | 106896552 A | 6/2017 |
| CN | 106940966 A | 7/2017 |
| CN | 108230913 A | 6/2018 |
| CN | 108279737 A | 7/2018 |
| CN | 110794923 A | 2/2020 |
| JP | 2003075863 A | 3/2003 |
| JP | 2018506729 A | 3/2018 |
| KR | 101593042 B1 | 2/2016 |
| WO | 20190187735 A1 | 10/2019 |

OTHER PUBLICATIONS

First Office Action for Chinese Application No. 201911000923.6, dated Oct. 9, 2020, 8 Pages.

International Search Report and Written Opinion for Application No. PCT/CN2020/121148, dated Jan. 14, 2021, 9 Pages.

Search Report for Chinese Application No. 201911000923.6, dated Apr. 17, 2020, 7 Pages.

First Office Action for Japanese Application No. 2022-523495, dated Apr. 19, 2023, 3 Pages.

* cited by examiner

DISPLAY MODULE, CONTROL METHOD THEREOF AND APPARATUS THEREOF, AND ELECTRONIC DEVICE CROSS-REFERENCE TO RELATED APPLICATIONS

CROSS-REFERENCE TO RELATED APPLICATIONS

This application is a continuation application of International Application No. PCT/CN2020/121148 filed on Oct. 15, 2020, which claims priority to Chinese Patent Application No. 201911000923.6 filed on Oct. 21, 2019, which are incorporated herein by reference in their entireties.

TECHNICAL FIELD

The present disclosure relates to the technical field of communication devices, and in particular to a display module, a control method thereof and an apparatus thereof, and an electronic device.

BACKGROUND

As users have greater demands and technology progress is increasingly rapid, screens account for great ratios of electronic devices, so that large-screen electronic devices are formed. Large screen-to-body ratios can not only improve display performance of the electronic devices, but also enhance appearance performance of the electronic devices.

In the related art, display screens of the electronic devices usually have frames, and the frames of the display screens are non-display areas. To further increase the screen-to-body ratios, an increasing number of electronic devices are provided with locally curved or multi-curved display screens. However, because an area in which a display screen is bent and butted is a curved surface, a display effect on a plane cannot be achieved, which ultimately affects the presentation of display content and leads to poor user experience.

SUMMARY

The present disclosure provides a display module.

A display module is provided, including a display screen and a refracted light guide member, where the display screen includes a first abutting edge, a second abutting edge, and a display body located between the first abutting edge and the second abutting edge, where the first abutting edge and the second abutting edge are located in space enclosed by the display body, the display body includes a first curved display area and a second curved display area, where the first curved display area is connected to the first abutting edge, the second curved display area is connected to the second abutting edge, the first curved display area and the second curved display area form a groove, the refracted light guide member is fixed in the groove, and the refracted light guide member refracts light, emitted from the first curved display area and the second curved display area, onto a plane in which an opening of the groove is located.

An electronic device is provided, including the display module.

A method for controlling a display module is provided, where the display module is the foregoing display module, and the control method includes:
controlling the display of the display body;
splicing light refracted from the first curved display area and the second curved display area onto the plane into a first display image; and
splicing a second display image formed in a main display area of the display body with the first display image, to enable the display module to present continuous display patterns, where the first curved display area and the second curved display area are connected to two opposite ends of the main display area, respectively.

An apparatus for controlling a display module is provided, where the display module is the foregoing display module, and the control apparatus includes:
a first control unit, configured to control the display of the display body;
a second control unit, configured to splice light refracted from the first curved display area and the second curved display area onto the plane into a first display image; and
a third control unit, configured to splice a second display image formed in a main display area of the display body with the first display image, to enable the display module to present continuous display patterns, where the first curved display area and the second curved display area are connected to two opposite ends of the main display area, respectively.

An electronic device is provided, including a processor, a memory, and a computer program stored in the memory and executable in the processor, and when the computer program is executed by the processor, the foregoing control method is implemented.

A computer-readable storage medium is provided, where the computer-readable storage medium stores a computer program, and when the computer program is executed, the foregoing control method is implemented.

The technical solutions used by the present disclosure can achieve the following beneficial effects:

For the display module disclosed in the embodiments of the present disclosure, a structure of the display module is improved in the related art. The first curved display area and the second curved display area form the groove at a joint, and the refracted light guide member is disposed in the groove. The refracted light guide member can refract the light, emitted from the first curved display area and the second curved display area, onto the plane in which the opening of the groove is located, so that the display content is displayed on the same plane. In this case, display content that is not easy to watch due to bending of a display screen can be presented onto a plane that is easy to watch, which can undoubtedly improve the display performance of the display module.

BRIEF DESCRIPTION OF DRAWINGS

The accompanying drawings described herein are used to provide further understanding of the present disclosure and constitute a part of the present disclosure. The illustrative embodiments of the present disclosure and descriptions thereof are used to explain the present disclosure, and do not constitute an improper limitation to the present disclosure. In the accompanying drawings.

REFERENCE SIGNS

100-Display screen, 110-First abutting edge, 120-Second abutting edge, 130-Display body, 131-First curved display area, 132-Second curved display area,
200-Refracted light guide member, 210-First sub-refracted light guide member, 220-Second sub-refracted light guide member,
300-Flexible printed circuit board,
A-Space, B-Groove.

DETAILED DESCRIPTION

To make the objectives, technical solutions, and advantages of the present disclosure clearer, the following clearly describes the technical solutions of the present disclosure with reference to specific embodiments of the present disclosure and the accompanying drawings. Apparently, the described embodiments are some rather than all of the embodiments of the present disclosure. All other embodiments obtained by a person of ordinary skill in the art based on the embodiments of the present disclosure shall fall within the protection scope of the present disclosure.

The following describes in detail the technical solutions disclosed in the embodiments of the present disclosure with reference to the accompanying drawings.

Figure 1:
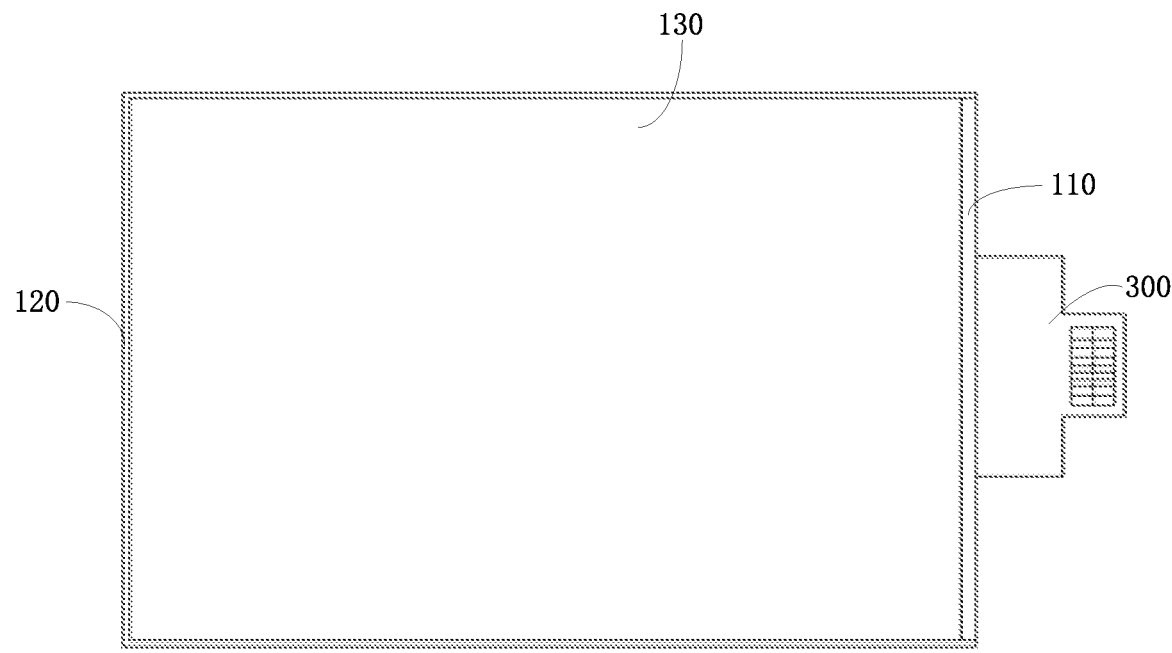
FIG. 1 is a schematic structural diagram of a display module according to an embodiment of the present disclosure before a display screen thereof is formed.
Figure 2:
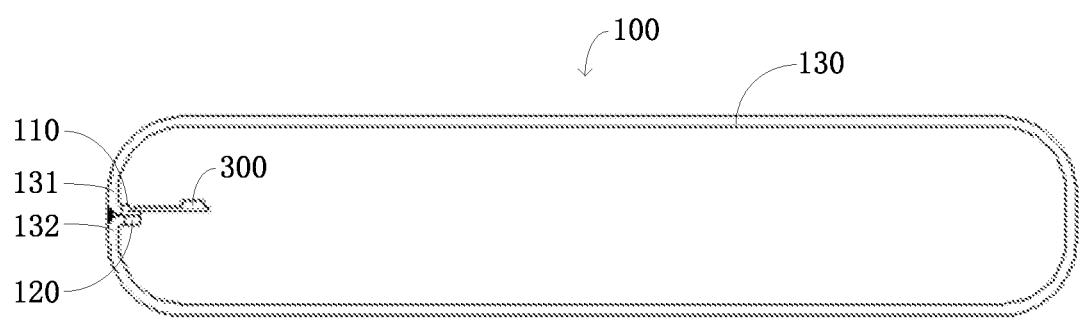
FIG. 2 is a schematic structural diagram of a display module according to an embodiment of the present disclosure.
Figure 3:
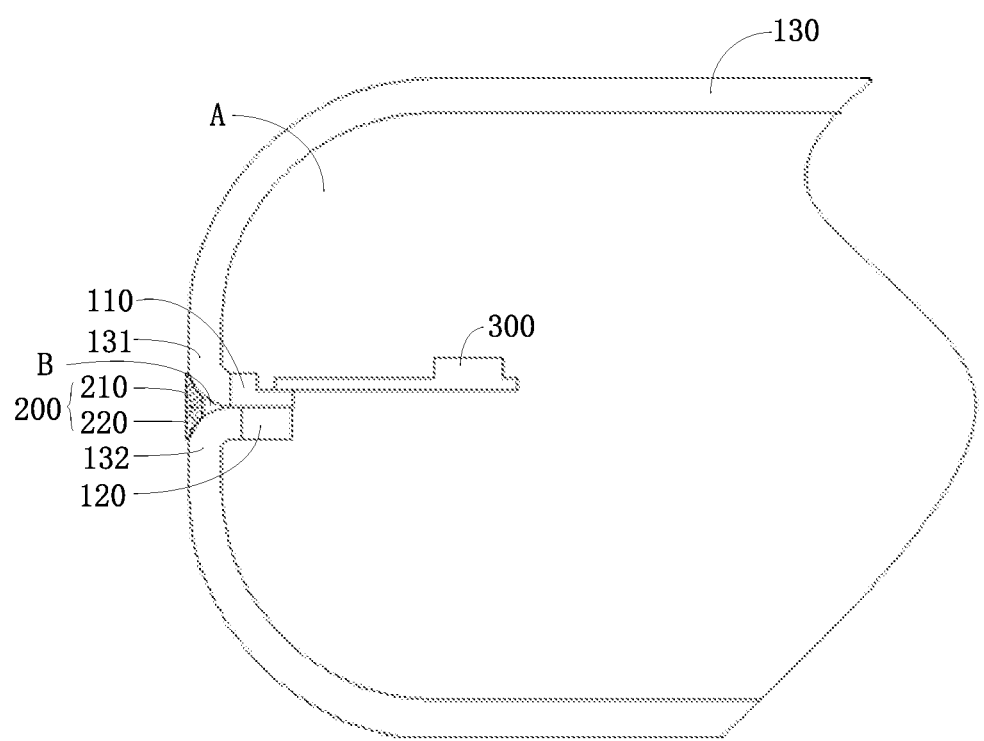
FIG. 3 is a partially enlarged structural diagram of FIG. 2.
Figure 4:
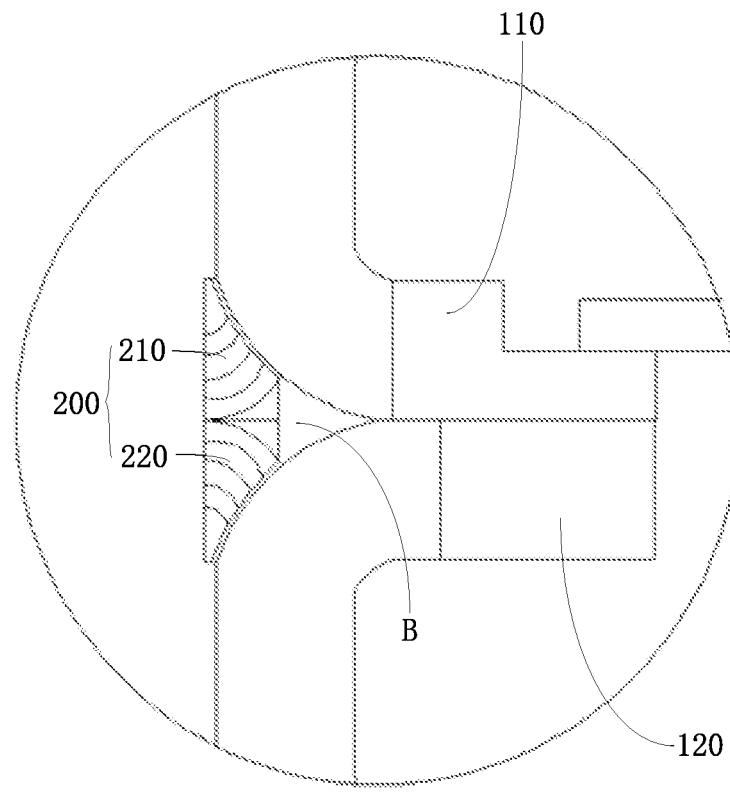
FIG. 4 is a partially enlarged structural diagram of FIG. 3.
Figure 5:
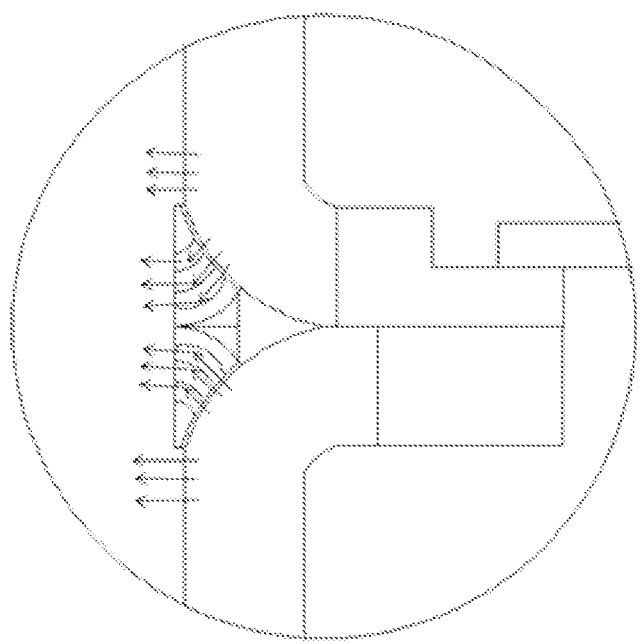
FIG. 5 is a structural optical diagram of FIG. 4.

Referring to FIG. 1 to FIG. 5, embodiments of the present disclosure disclose a display module. The disclosed display module usually applies to an electronic device. The display module disclosed in the embodiments of the present disclosure includes a display screen 100 and a refracted light guide member 200.

The display screen 100 is a display member of the display module. The display screen 100 includes a first abutting edge 110, a second abutting edge 120, and a display body 130. The display body 130 is located between the first abutting edge 110 and the second abutting edge 120. The display body 130 is connected to the first abutting edge 110 and the second abutting edge 120, and the first abutting edge 110 and the second abutting edge 120 are essentially frames of the display screen 100, which are configured to implement power supply connection, routing, communication connection, and the like of the display screen 100. The first abutting edge 110 and the second abutting edge 120 are connected to the display body 130 in many ways. The ways are well-known technologies and are not described herein.

In the embodiments of the present disclosure, the display body 130 is disposed through enclosure, and the first abutting edge 110 and the second abutting edge 120 are located in space A enclosed by the display body 130. The first abutting edge 110 may be connected to the second abutting edge 120. Specifically, the first abutting edge 110 is connected to the second abutting edge 120, so that an enclosure shape of the display body 130 can be maintained. In an alternative solution, the first abutting edge 110 and the second abutting edge 120 may be connected by an adhesive layer.

To present a better display screen, in an alternative solution, the display body 130 may be an annular display body. Certainly, the display body 130 may further be a bending structural member with another shape, and a specific shape of the display body 130 is not limited in the embodiments of the present disclosure.

Generally, the display screen 100 may be a hard structural member, which may be bent through bending process (such as heat bending process), so as to achieve deformation of the display body 130. In an alternative solution, the display screen disclosed in the embodiments of the present disclosure may be a flexible display screen, which can undoubtedly help to bend the display body 130. Based on this, in the embodiments of the present disclosure, the display body 130 is an annular display body formed by bending the flexible display screen.

In the embodiments of the present disclosure, the display body 130 includes a first curved display area 131 and a second curved display area 132. Both of the first curved display area 131 and the second curved display area 132 are curved areas formed by bending the display body 130. The first curved display area 131 is connected to the first abutting edge 110, and the second curved display area 132 is connected to the second abutting edge 120. Because the first abutting edge 110 is connected to the second abutting edge 120, the first curved display area 131 and the second curved display area 132 can be connected, and finally a head-to-tail connection of the display body 130 can be implemented.

The display body 130 may have a variety of structures, and the display body 130 may usually include another display area except the first curved display area 131 and the second curved display area 132. In a specific implementation, the display body 130 may further include a main display area, and the first curved display area 131 and the second curved display area 132 are connected to two opposite ends of the main display area, respectively.

The first curved display area 131 and the second curved display area 132 form a groove B. The refracted light guide member 200 refracts light, emitted from the first curved display area 131 and the second curved display area 132, onto a plane in which an opening of the groove B is located, so that display content is displayed on one plane.

In the embodiments of the present disclosure, the refracted light guide member 200 may have a light refracting member made of a polymer light-transmitting material or glass. Under the regulation of the refracted light guide member 200, the light emitted from the first curved display area 131 and the second curved display area 132 can be refracted onto the same plane, so that a display effect of the first curved display area 131 and the second curved display area 132 can be improved.

For the display module disclosed in the embodiments of the present disclosure, a structure of the display module is improved in the related art. The first curved display area 131 and the second curved display area 132 form the groove B at a joint, and the refracted light guide member 200 is disposed in the groove B. The refracted light guide member 200 can refract the light, emitted from the first curved display area 131 and the second curved display area 132, onto the plane in which the opening of the groove B is located, so that display content can be displayed on the same plane. In this case, display content that is not easy to watch due to bending of a display screen can be presented onto a plane that is easy to watch, which can undoubtedly improve the display performance of the display module.

In an alternative solution, the display module disclosed in the embodiments of the present disclosure may further include a flexible printed circuit board 300. The flexible printed circuit board 300 may be located in space A enclosed by the display body 130. One end of the flexible printed circuit board 300 is electrically connected to the first abutting edge 110 or the second abutting edge 120, so as to supply power to the entire display screen 100. The other end of the flexible printed circuit board 300 is usually electrically connected to a main board of the electronic device, so that the main board can provide power supply. Certainly, the flexible printed circuit board 300 may further be replaced by another flexible electric connector such as a flexible cable, and the embodiments of the present disclosure do not limit a specific type of the flexible electric connector. The flexible electric connector is configured to achieve power supply connection and communication connection, which can undoubtedly make full use of good deformation ability of the flexible electric connector to facilitate operation.

In the embodiments of the present disclosure, the refracted light guide member 200 may have a variety of structures. Please refer to FIG. 3 to FIG. 5 again, to improve connection stability, in an alternative solution, the refracted light guide member 200 may include a first side surface and a second side surface which are opposite to each other. The first side surface is attached to the first curved display area 131, and the second side surface may be attached to the second curved display area 132. In this case, the first side surface matches the first curved display area 131, and the second side surface matches the second curved display area 132, so that an assembly effect can be improved.

Specifically, the first side surface may be bonded to the first curved display area 131 by an OCA layer or a UV adhesive layer, and the second side surface may be bonded to the second curved display area 132 by an OCA layer or a UV adhesive layer. Such bonding assembly method has the advantages of simple operation and easy implementation. In addition, the thickness of the adhesive layer may be easily controlled to be thinner, so that the refracted light guide member 200 and the display body 130 can be assembled more compactly. In a specific implementation, the thickness of the OCA layer or the UV adhesive layer may be 0.01 mm-0.5 mm.

To further improve a display effect, in an alternative solution, a surface that is of the refracted light guide member 200 and that is in the same direction as the opening of groove B is coplanar with a surface in which the opening is located, and the two surfaces are both planes. In this case, the refracted light guide member 200 does not protrude from the opening of the groove B, so that the appearance performance of the display module can be improved, and the electronic device provided with such display module may have good grip feeling.

For the display module disclosed in the embodiments of the present disclosure, the refracted light guide member 200 can emit light from one plane of the refracted light guide member 200 after refracting the light from the first curved display area 131 and the second curved display area 132. A person of ordinary skill in the art can achieve the foregoing purpose through various optical designs, and light refraction may be designed with related technologies, which is not described herein.

There are many structures that achieve the foregoing optical functions. For example, the refracted light guide member 200 may be a microporous refracted light guide plate or a prismatic refractive plate.

If the refracted light guide member 200 is the microporous refracted light guide plate, a surface that is of the microporous refracted light guide plate and that faces the first curved display area 131 and the second curved display area 132 is a first surface, and a surface that is of the microporous refracted light guide plate and that is in the same direction as the opening of the groove B is a second surface, and both the first surface and the second surface are provided with transparent cover layers. The transparent cover layers may be transparent adhesive layers. The transparent cover layers can prevent dust from entering micropores of the microporous refracted light guide plate.

In an alternative solution, the refracted light guide member 200 disclosed in the embodiments of the present disclosure may include a first sub-refracted light guide member 210 and a second sub-refracted light guide member 220. The first sub-refracted light guide member 210 is disposed opposite to the first curved display area 131, and light from the first curved display area 131 is refracted onto the plane in which the opening of the groove B is located.

Similarly, the second sub-refracted light guide member 220 is disposed opposite to the second curved display area 132, and light from the second curved display area 132 is refracted onto the plane in which the opening of the groove B is located. Surfaces that are of the first sub-refracted light guide member 210 and the second sub-refracted light guide member 220 and that face the opening of the groove B are coplanar with the plane in which the opening is located. In this case, the light from the first curved display area 131 and the second curved display area 132 are reflected onto the plane in which the opening is located, so that a display image presented by the plane may be more easily and better spliced with a display image of another area of the display body 130.

In an alternative solution, at least one of a surface of the first sub-refracted light guide member 210 and a surface of the second sub-refracted light guide member 220 that abut against each other is provided with a light shielding layer. The light shielding layer can isolate light transmitted in the first sub-refracted light guide member 210 from light transmitted in the second sub-refracted light guide member 220, so that mutual interference between them is prevented finally. In a specific implementation, the light shielding layer may be an ink layer or a light shielding film.

Based on the display module disclosed in the embodiments of the present disclosure, an embodiment of the present disclosure discloses an electronic device, including the display module described in the foregoing embodiments. The electronic device disclosed in the embodiment of the present disclosure may be a mobile phone, a tablet computer, an e-book reader, a game console, an in-vehicle navigator, a smart watch, or the like. In the embodiment of the present disclosure, a specific type of the electronic device is not limited.

Specifically, the electronic device may further include a housing and other accessories, such as a main board, disposed in the housing, and other accessories of the electronic device may be assembled in space A enclosed by a display screen 100.

Based on the display module disclosed in the embodiments of the present disclosure, an embodiment of the present disclosure discloses a control method for the display module. The control method includes the following steps.

S101: Control the display of a display body 130;

S102: Splice light refracted from a first curved display area 131 and a second curved display area 132 onto a plane into a first display image; and S103: Splice a second display image formed in a main display area of the display body 130 with the first display image, to enable a display module to present continuous display patterns, where the first curved display area 131 and the second curved display area 132 are connected to two opposite ends of the main display area, respectively.

Generally, a central processing unit of the electronic device controls display of each area of the display screen in the electronic device, and a specific control process is well-known technologies, which is not described herein.

Image splicing implemented in step S103 may be implemented by existing splicing technologies.

Based on the control method disclosed in this embodiment of the present disclosure, an embodiment of the present disclosure discloses an apparatus for controlling a display module. The control apparatus includes:
- a first control unit, configured to control the display of a display body 130;
- a second control unit, configured to splice light refracted from a first curved display area 131 and a second curved display area 132 onto a plane into a first display image; and
- a third control unit, configured to splice a second display image formed in a main display area of the display body 130 with the first display image, to enable a display module to present continuous display patterns, where the first curved display area 131 and the second curved display area 132 are connected to two opposite ends of the main display area, respectively.

Based on the control method, an embodiment of the present disclosure discloses an electronic device. The electronic device may include a processor, a memory, and a computer program stored in the memory and executable in the processor. When the computer program is executed by the processor, the foregoing control method is implemented.

Based on the control method, an embodiment of the present disclosure discloses a computer-readable storage medium. The computer-readable storage medium stores a computer program, and when the computer program is executed, the foregoing control method is implemented.

A person of ordinary skill in the art may realize that units and algorithm steps of various examples described with reference to the embodiments disclosed in this specification can be implemented by using electronic hardware, or a combination of computer software and electronic hardware. Whether these functions are performed by using hardware or software depends on a specific application and design constraints of the technical solutions. A person of ordinary skill in the art may use different methods to achieve the described functions for each particular application, but it should not be considered that the implementation goes beyond the scope of the present disclosure.

A person of ordinary skill in the art may clearly understand that, for convenient and simple description, for the specific working processes of the system, apparatus, and unit described above, reference may be made to a corresponding process in the foregoing method embodiments, and details are not described herein again.

In the embodiments provided in this application, it should be understood that the disclosed apparatus and method may be implemented in other manners. For example, the apparatus embodiment described above is only an example. For example, division into the units is only logical function division. There may be other division manners in actual implementation, for example, a plurality of units or components may be combined or integrated into another system, or some features may be ignored or not implemented. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one location, or may be distributed on a plurality of network units. Some or all of the units may be selected according to actual needs to achieve the objective of the solutions of the embodiments.

In addition, function units in the embodiments of the present disclosure may be integrated into one processing unit, or each of the units may exist alone physically, or two or more units are integrated into one unit.

If the functions are implemented with a form of software function units and sold or used as independent products, the functions may be stored in a computer-readable storage medium. Based on this understanding, the essence of the technical solutions of the present disclosure, the part contributing to the prior art, or some of the technical solutions may be represented in a form of software product. The computer software product is stored in a storage medium, and includes several instructions to enable a computer device (which may be a personal computer, a server, a network device, or the like) to perform all or some of the steps of the method described in various embodiments of the present disclosure. The storage medium includes various media that can store a program code such as a USB flash disk, a mobile hard disk, a ROM, a RAM, a magnetic disk, an optical disc, or the like.

A person of ordinary skill in the art can understand that some or all processes of the implementation of the foregoing method in the embodiments can be implemented by controlling relevant hardware through a computer program. The program may be stored in a computer readable storage medium, and when the program is executed, the processes of the embodiments of the foregoing methods can be included. The storage medium may be a magnetic disk, an optical disc, a read-only memory (Read-Only Memory, ROM), a random access memory (Random Access Memory, RAM), or the like.

The foregoing embodiments of the present disclosure focus on differences between various embodiments. Different optimization features of the various embodiments can be combined to form a better embodiment as long as they are not contradictory. Considering conciseness of description, details are not described herein.

The foregoing descriptions are merely embodiments of the present disclosure, but are not intended to limit the present disclosure. For a person of ordinary skill in the art, the present disclosure may have various changes and variations. Any modification, equivalent replacement, improvement, or the like made without departing from the spirit and principle of the present disclosure shall fall within the scope of claims of the present disclosure.

The invention claimed is:

1. A display module, comprising a display screen and a refracted light guide member, wherein the display screen comprises a first abutting edge, a second abutting edge, and a display body located between the first abutting edge and the second abutting edge, wherein the first abutting edge and the second abutting edge are located in space enclosed by the display body, the display body comprises a first curved display area and a second curved display area, wherein the first curved display area is connected to the first abutting edge, the second curved display area is connected to the second abutting edge, the first curved display area and the second curved display area form a groove, the refracted light guide member is fixed in the groove, and the refracted light guide member refracts light, emitted from the first curved display area and the second curved display area, onto a plane in which an opening of the groove is located;

wherein the refracted light guide member comprises a first sub-refracted light guide member and a second sub-refracted light guide member, wherein the first sub-refracted light guide member is disposed opposite to the first curved display area, and light from the first curved display area is refracted onto the plane in which the opening of the groove is located; and the second sub-refracted light guide member is disposed opposite to the second curved display area, light from the second curved display area is refracted onto the plane in which the opening of the groove is located, and surfaces that are of the first sub-refracted light guide member and the second sub-refracted light guide member and that face the opening are coplanar with the plane in which the opening is located;

wherein at least one of a surface of the first sub-refracted light guide member and a surface of the second sub-refracted light guide member that abut against each other is provided with a light shielding layer.

2. The display module according to claim 1, further comprising a flexible printed circuit board, wherein the flexible printed circuit board is located in the space, and one end of the flexible printed circuit board is electrically connected to the first abutting edge or the second abutting edge.

3. The display module according to claim 1, wherein the display screen is a flexible display screen.

4. The display module according to claim 1, wherein the refracted light guide member comprises a first side surface and a second side surface that are opposite to each other, wherein the first side surface is attached to the first curved display area, and the second side surface is attached to the second curved display area.

5. The display module according to claim 4, wherein a surface that is of the refracted light guide member and that is in the same direction as the opening of the groove is coplanar with a surface in which the opening is located, and the two surfaces are both planes.

6. The display module according to claim 4, wherein, by an OCA layer or a UV adhesive layer, the first side surface is bonded to the first curved display area, and the second side surface is bonded to the second curved display area.

7. The display module according to claim 6, wherein the thickness of the OCA layer or the UV adhesive layer is 0.01 mm-0.5 mm.

8. The display module according to claim 1, wherein the refracted light guide member is a microporous refracted light guide plate or a prismatic refractive plate.

9. The display module according to claim 8, wherein a surface that is of the microporous refracted light guide plate and that faces the first curved display area and the second curved display area is a first surface, and a surface that is of the microporous refracted light guide plate and that is in the same direction as the opening of the groove is a second surface, wherein both the first surface and the second surface are provided with transparent cover layers.

10. The display module according to claim 1, wherein the display body is an annular display body.

11. N electronic device, comprising a display module, wherein the display module comprises: a display screen and a refracted light guide member, wherein the display screen comprises a first abutting edge, a second abutting edge, and a display body located between the first abutting edge and the second abutting edge, wherein the first abutting edge and the second abutting edge are located in space enclosed by the display body, the display body comprises a first curved display area and a second curved display area, wherein the first curved display area is connected to the first abutting edge, the second curved display area is connected to the second abutting edge, the first curved display area and the second curved display area form a groove, the refracted light guide member is fixed in the groove, and the refracted light guide member refracts light, emitted from the first curved display area and the second curved display area, onto a plane in which an opening of the groove is located;

wherein the refracted light guide member comprises a first sub-refracted light guide member and a second sub-refracted light guide member, wherein the first sub-refracted light guide member is disposed opposite to the first curved display area, and light from the first curved display area is refracted onto the plane in which the opening of the groove is located; and the second sub-refracted light guide member is disposed opposite to the second curved display area, light from the second curved display area is refracted onto the plane in which the opening of the groove is located, and surfaces that are of the first sub-refracted light guide member and the second sub-refracted light guide member and that face the opening are coplanar with the plane in which the opening is located;

wherein at least one of a surface of the first sub-refracted light guide member and a surface of the second sub-refracted light guide member that abut against each other is provided with a light shielding layer.

12. The electronic device according to claim 11, further comprising a flexible printed circuit board, wherein the flexible printed circuit board is located in the space, and one end of the flexible printed circuit board is electrically connected to the first abutting edge or the second abutting edge.

13. The electronic device according to claim 11, wherein the refracted light guide member comprises a first side surface and a second side surface that are opposite to each other, wherein the first side surface is attached to the first curved display area, and the second side surface is attached to the second curved display area.

14. The electronic device according to claim 13, wherein a surface that is of the refracted light guide member and that is in the same direction as the opening of the groove is coplanar with a surface in which the opening is located, and the two surfaces are both planes.

15. The electronic device according to claim 13, wherein, by an OCA layer or a UV adhesive layer, the first side surface is bonded to the first curved display area, and the second side surface is bonded to the second curved display area.

16. The electronic device according to claim 11, wherein the refracted light guide member is a microporous refracted light guide plate or a prismatic refractive plate.

17. The electronic device according to claim 16, wherein a surface that is of the microporous refracted light guide plate and that faces the first curved display area and the second curved display area is a first surface, and a surface that is of the microporous refracted light guide plate and that is in the same direction as the opening of the groove is a second surface, wherein both the first surface and the second surface are provided with transparent cover layers.

* * * * *